United States Patent [19]

DeLeeuw et al.

[11] Patent Number: 4,828,717
[45] Date of Patent: May 9, 1989

[54] DEVICE AND METHOD FOR REDUCING VOLUME OF AQUEOUS WASTE EFFLUENTS

[75] Inventors: James A. DeLeeuw, River Hills; Raymond E. Sims, Hales Corners, both of Wis.

[73] Assignee: Arkay Corporation of Wisconsin, Milwaukee, Wis.

[21] Appl. No.: 181,686

[22] Filed: Apr. 14, 1988

[51] Int. Cl.[4] .......................... B01D 1/30; B01D 36/00
[52] U.S. Cl. ..................................... 210/740; 210/741; 210/742; 210/743; 210/744; 210/104; 210/139; 210/143; 210/149; 210/178; 210/179; 210/196; 210/197; 210/206; 210/323.2; 210/341; 210/805; 159/31; 159/32; 159/47.3; 159/901; 75/118 P; 354/324; 354/325; 354/328
[58] Field of Search ..................... 210/86, 89, 99, 101, 210/102, 103, 104, 138, 139, 140, 141, 142, 143, 149, 175, 178, 179, 180, , 181, 196, 197, 206, 323.2, 341, 407, 416.1, 472, 740, 741, 742, 743, 744, 774, 805; 75/118 P; 266/170; 159/31, 32, 47.3, 901, DIG. 1, DIG.23; 354/324, 325, 328

[56] References Cited

U.S. PATENT DOCUMENTS

| | | | |
|---|---|---|---|
| 3,715,308 | 2/1973 | Sulfaro et al. | 210/743 |
| 4,324,481 | 4/1982 | Becherer | 354/324 |
| 4,421,399 | 12/1983 | Steube | 354/324 |
| 4,427,553 | 1/1984 | Fore | 210/743 |
| 4,451,132 | 5/1984 | Kishimoto | 354/324 |
| 4,724,044 | 2/1988 | Weishaar et al. | 159/32 |

OTHER PUBLICATIONS

"Introducing The New Economics of Compliance!", Arkay promotional brochure, Feb. 1987.

Primary Examiner—Richard V. Fisher
Assistant Examiner—Cynthia L. Nessler
Attorney, Agent, or Firm—Glenn A. Buse'

[57] ABSTRACT

The device for reducing the volume of an aqueous waste effluent includes a holding tank, a heating tank for receiving waste effluent from the holding tank and including a heater for heating the waste effluent to a predetermined temperature which is below the boiling point of water and high enough to cause a portion of the water to evaporate and be discharged as water vapors, an agitation pump for continuously recirculating the liquids contents of the heating tank and filter units mounted on top of the heating tank for separating solids and particulate matter from the resulting slurry and returning the filtrate to the heating tank. During operation, a transfer pump transfers waste effluent from the holding tank to the heating tank, the heater is turned off after a predetermined heating cycle to allow the slurry to cool to a temperature which promotes precipitation of dissolved solids, a filter pump thereafter periodically introduces a predetermined quantity of the cooled slurry into a filter unit and the filtrate drains back into the heating tank, and the heating, cooling and filter cycles are repeated. The solids collected in the filter unit(s) can be refined to recover valuable metals or disposed of in an appropriate manner.

24 Claims, 5 Drawing Sheets

DEVICE AND METHOD FOR REDUCING VOLUME OF AQUEOUS WASTE EFFLUENTS

BACKGROUND OF THE INVENTION

This invention relates to devices and methods for reducing the volume of aqueous waste effluents containing dissolved solids, such as developer, fixer and/or wash water from processing photosensitive materials.

Various aqueous waste effluents containing dissolved solids, such as developer, fixer and/or wash water from processing photographic film, X-ray film, graphic art materials and the like, often include amounts of undesirable chemicals, such as silver, lead, ferrocyanide, thiosulfates and organic materials, above that permitted by federal, state and/or local government regulations for disposal in open bodies of water, muicipal sewers, septic tanks, etc. Consequently, such waste effluents are considered hazardous or do not meet local sewer codes and require special handling and disposal techniques which can be quite expensive.

Three general approaches have been used for removing hazardous constituents from such effluents. In one approach, the effluent is circulated through one or more resin columns and the toxic constituents collect on the resin. The columns must be periodically treated to strip the collected constituents from the resin. In a second approach, the effluent is charged with a small electrical charge which causes metal ions to disassociate and form a slurry which may be collected and refined to recover silver and other valuable metals. In a third approach, the effluent is heated to gradually evaporate water and to form a sludge which can be disposed of, or in some cases, can be refined to recover the valuable metals.

The evaporate approach is advantageous for applications generating smaller volumes of aqueous waste effluents because of the relatively low initial and operational cost for the equipment and the equipment does not require a large amount of space. Prior evaporative systems have one or more shortcomings. One type prior system must be periodically shut down to physically remove the sludge from the evaporative unit. Another type includes means for pumping the slurry into a barrel for disposal. However, the sludge produced by both type prior systems is considered a hazardous waste under some government regulations because of the water content and, therefore, special handling and disposal requirements must be met. The residual water increases the volume of material to be handled, transported and/or disposed. In some cases, residual water must be removed from the sludge before it can be refined to recover valuable metals or disposed.

SUMMARY OF THE INVENTION

An object of the invention is to provide a simple, reliable device and method for reducing the volume of aqueous waste effluents containing dissolved solids and dispersed particulate matter.

Another object of the invention is to provide such a device and method which is capable of reducing the volume of the waste effluent up to 90-95% and producing a waste product having a relatively low moisture content.

Another object of the invention is to provide such a device which can operate on demand for maximum energy efficiency.

Another object of the invention is to provide such a device which is compact, fully automated and requires minimum maintenance.

Other objects, aspects and advantages of the invention will become apparent to those skilled in the art upon reviewing the following detailed description, the drawings and the appended claims.

The invention provides a device for reducing the volume of an aqueous waste effluent containing dissolved solids and dispersed particulate matter including a holding tank for receiving the waste effluent, a processing or heating tank for receiving the waste effluent from the holding tank and including a heater for heating the effluent to a predetermined temperature which is below the boiling point of water and high enough to cause a portion of the water to evaporate and be discharged as water vapor, an exhaust duct connected in communication with the upper portion of the heating tank through which water vapors are discharged from the heating tank, one or more filter units for separating solids from the resulting slurry and having an outlet for returning the filtrate to the heating tank and means for agitating the liquid contents of the heating tank. After a predetermined heating period, the heater is turned off to allow the slurry to cool to a temperature which promotes precipitation of dissolved solids, a predetermined quantity of the cooled slurry is introduced into a filter unit, such as by a filter pump, and the heating, cooling and filter cycles are repeated.

In one embodiment, the agitation means is an agitation pump for continuously recirculating the liquid contents of the heating tank and the agitation pump outlet is connected to conduits which are arranged to disperse the recirculated liquid into the bottom portion of the heating tank in a manner which produces a churning action at the surface of the liquid contents to enhance evaporation and prevent solids building in bottom of the heating tank.

In one embodiment, the device includes a plurality of filter units and each includes a vertically extending filter bag having an open upper end removably supported above the heating tank and a lower end located inside the heating tank above the maximum liquid level therein. A filter pump delivers a predetermined quantity of the cooled slurry into a conduit including a valve for selectively directing the slurry flow into one of the filter units.

Operation of the heater and filter pumps preferably is automatically controlled by an electrical system including means for interrupting electrical power to the heater for a predetermined cooling period and for initiating operation of the filter pump after the cooling cycle has commenced. The electrical system preferably includes means for operating the filter pumps periodically during the filter cycle to introduce a predetermined quantity of the cooled slurry into a filter unit.

The transfer pump preferably is operated on demand in response to liquid level sensors in the holding and heating tanks. The transfer pump automatically transfers waste effluent from the holding tank into the heating tank any time the liquid level in the heating tank is below a predetermined minimum level and the liquid level in the holding tank is above a predetermined minimum level.

The electrical system preferably also includes a controller for adjusting the speed of the fan in response to the temperature of the liquid in the heating tank.

In one embodiment, means are provided for adding an acidic or alkaline solution in response to the pH of the liquid in the heating tank being above or below a predetermined level, respectively.

BRIEF DESCRIPTION OF THE DRAWINGS

FIG. 7 is an enlarged, fragmentary view of the mounting arrangement for a filter bag.

DESCRIPTION OF THE PREFERRED EMBODIMENTS

While the device and method of the invention can be used for a wide variety of aqueous waste effluents containing solids and particulate matter, it is particularly adaptable for use with developer, fixer and/or wash water from processing photographic, X-ray, graphic art film, etc., and will be described in connection with that application.

Figure 1:
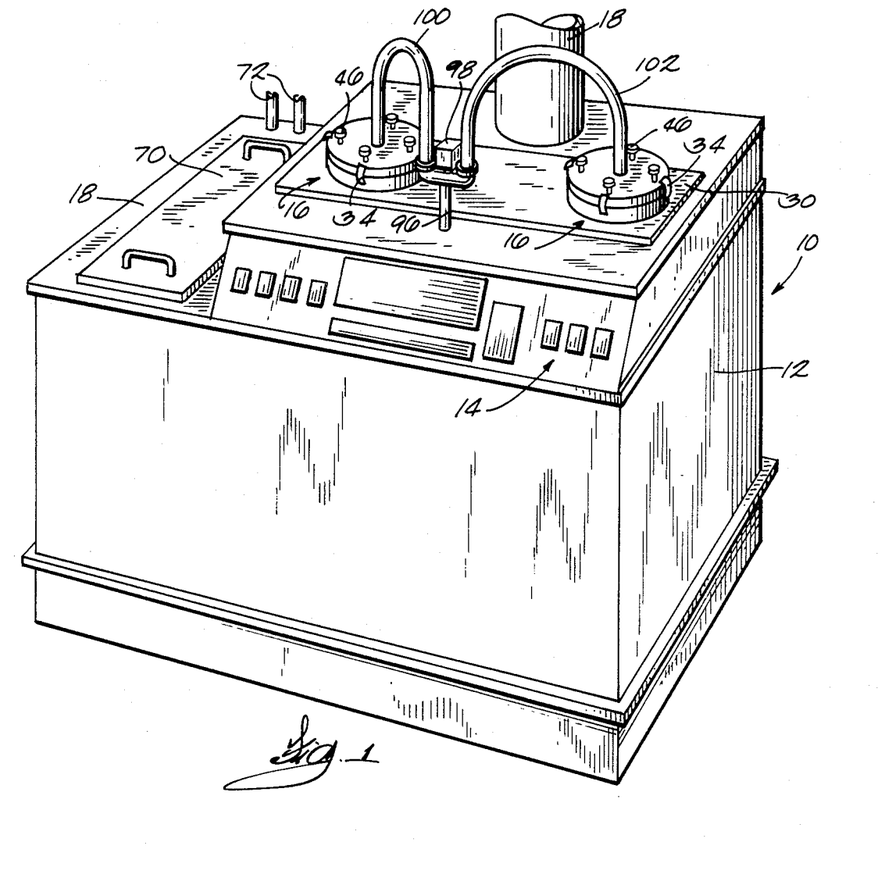
FIG. 1 is a perspective view of a device incorporating various features of the invention.

Referring to FIG. 1, the device 10 includes an outer housing 12, a front control panel 14, one or more (e.g. 2) filter units 16 and an exhaust duct 18 having an upper end open to the atmosphere outside the building or enclosure in which the device is located.

Figure 2:
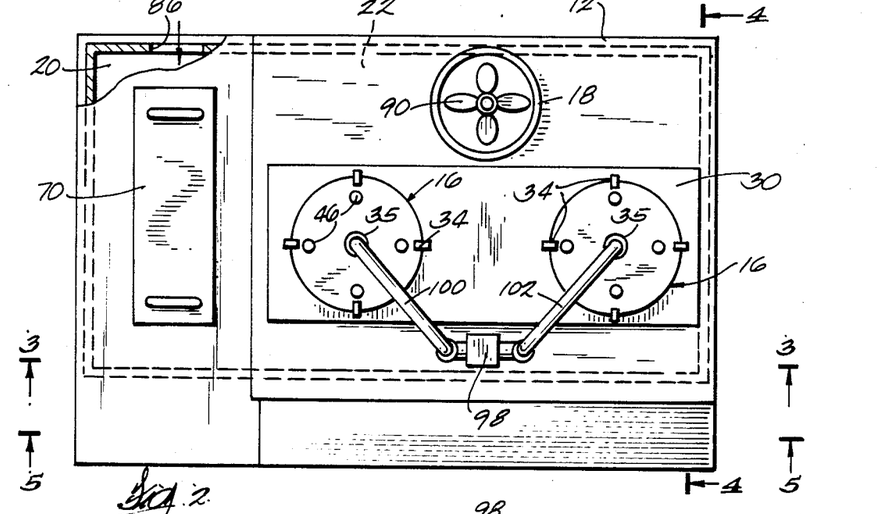
FIG. 2 is a top plan, partially broken away, view of the device illustrated in FIG. 1.

Located inside one end of the housing 12 (FIGS. 2-4) is a holding tank 20 which receives an aqueous waste effluent from a photographic film processor (not shown). The holding tank 20 serves both as a reservoir for the waste effluent and a holding area for the mixture of photochemicals to react and become homogenized.

Located in the housing 12 next to the holding tank 20 is a heating or processing tank 22 into which the waste effluent is transferred from the holding tank 20. The processing tank 22 includes an immersion type, electric heater 24 including a heating element 26 for heating the liquid contents of the processing tank 22 to a predetermined temperature which is below the boiling point of water and high enough to cause a portion of the water to evaporate. This temperature is usually about 130° to about 180° F. As water evaporates from the waste effluent, a slurry containing dissolved and precipitated solids and initially dispersed particulate matter is formed. Water vapor is exhausted to the atmosphere through the exhaust duct 18.

The filter units 16 serve to separate solids and particulate matter from the slurry. While various suitable filters and filter media can be used, in the specific construction illustrated, the filter units 16 are supported from the top of the processing tank 22 and each includes a cylindrical sleeve 28 opening into the processing tank 22 and mounted on a panel 30 removably mounted on top of a housing 12. Each filter unit 16 also includes a cover 32 removably mounted on the respective sleeve 28, such as by a plurality of leaf-type latches 34, and having an inlet 35 through which the slurry is introduced.

Each cover 32 supports a vertically extending, open top filter bag 36 which is made from a suitable fabric, such as polyproylene, and has an appropriate pore size for separating substantially all the solids and particulate matter from the slurry. To minimize premature plugging, the filter bag 36 can have a double bag construction with an inner bag having a larger pore size and the outer bag having an appropriate pore size for maximum separation.

Surrounding each filter bag 36 is a basket-like member or perforated sleeve 38 which serves to limit the expansion of the filter bag 36 during filtering, particularly as the bag becomes filled with solids, and thereby minimizes stretching of the fabric which can cause an undesired change in the pore size or shape. Extending across the open bottom of the perforated sleeve 38 is a pair of intersecting brackets 40 (one shown in FIG. 3) which support the bottom of the filter bag 36 at a location relatively close to, but above, the maximum liquid level in the processing tank 22.

Each filter bag 36 is removably mounted on the respective cover 32 so that the solids collected therein can be conveniently removed for reclamation or disposal. Referring to FIG. 7, the upper end of the filter bag 36 includes an elastomeric ring 42 which is disposed between an annular retainer 44 and the cover 32. The ring 42 is clamped between the retainer 44 and the cover 32 to retain the filter bag 36 by turning knobs 46 on each of a plurality of circumferentially spaced, studs 48 which extend through apertures in the cover 32 and are threaded into the retainer member 44.

Figure 3:
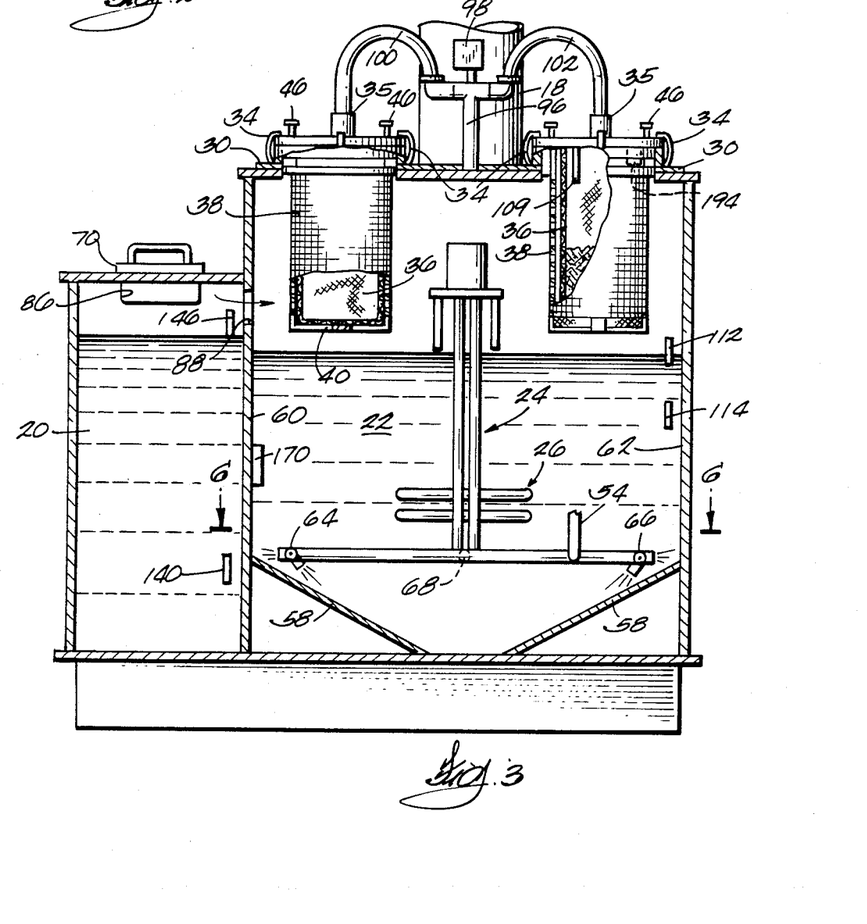
FIG. 3 is front sectional view taken generally along line 3—3 in FIG. 2.
Figure 4:
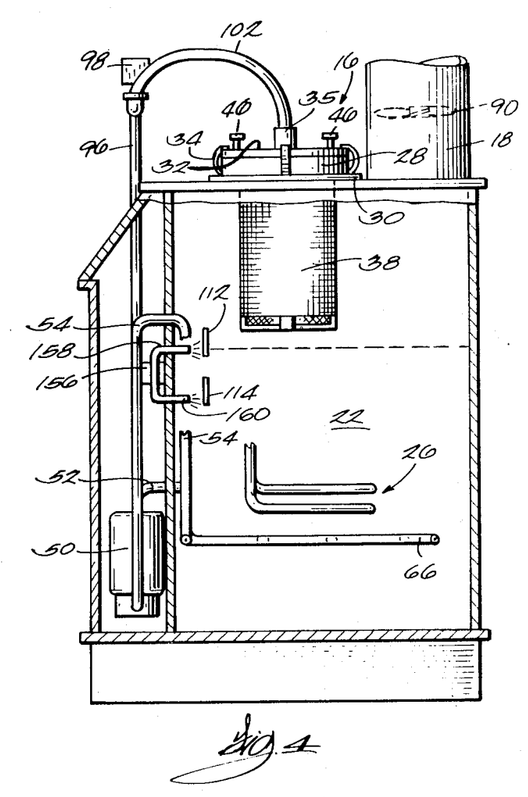
FIG. 4 is a side elevational view taken generally along line 4—4 in FIG. 2.
Figure 6:
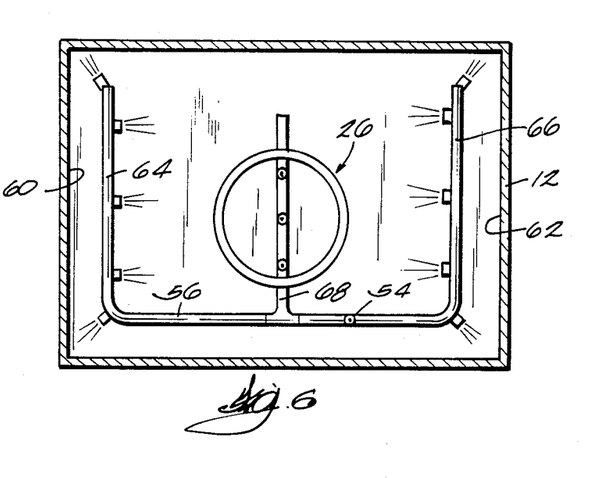
FIG. 6 is a plan sectional view taken generally along line 6—6 in FIG. 3.

Means are provided for agitating the contents of the processing tank 22 to minimize the settling of solids therefrom. In the specific construction illustrated, such means includes an electrically operated agitation pump 50 for continuously recirculating the liquid contents of the processing tank 22. The agitation pump 50 includes an inlet connected via a conduit 52 to the processing tank 22 and an outlet connected to a return conduit 54. As shown in FIGS. 3, 4 and 6, the return conduit 54 is connected to a manifold 56 located near the bottom of the processing tank 22. The bottom wall 58 of the processing tank 22 converges as illustrated in FIG. 3 to facilitate draining.

Connected to the manifold 56 and extending horizontally near each juncture of the bottom wall 58 and the side walls 60 and 62 of the processing tank 22 are a pair of conduits or pipes 64 and 66. The pipes 64 and 66 include spray nozzles or apertures for directing a flow of the pressurized liquid being recirculated by the agitation pump 50 into the bottom corners and along the bottom wall of the processing tank 22 as illustrated by arrows in FIGS. 3 and 6. This provides a scrubbing action which minimizes the build up of solids and/or particulate matter on the bottom wall of the processing tank.

Also connected to the manifold 56 and extending horizontally beneath the heating element 26 is a conduit or pipe 68 including a plurality of spray nozzles or apertures for directing an upward flow of pressurized liquid being recirculated by the agitation pump 50 through a central opening in the heating element 26. This provides a "cleaning" action for minimizing the buildup of solids on the heating element 26 which can adversely affect its heat transfer efficiency. Also, this upward flow, coupled with the agitation created by the flow from the pipes 64 and 66, minimizes settling of solids dispersed in the slurry and also produces a churning action which disrupts the surface of the liquid in the processing tank. Cooling at the liquid surface tends to cause the formation of a salt-rich layer which can inhibit evaporation. The surface disruption created by liquid being recirculated by the agitation pump 50 minimizes this undesirable condition.

The waste effluent from a photographic processor can be introduced into the device by lifting a cover 70 on the housing 12 and manually dumping it into the holding tank 20, by gravity feed from a processor (not shown) through one or more hose connections 72 (FIG. 1) on the housing 12 or by an electrically operated auxiliary pump 74 (FIG. 5) having an inlet connected via a conduit 76 to a processor and an outlet connected via a conduit 78 to the holding tank 20.

The effluent is transferred from the holding tank 20 to the processing tank 22 by an electrically operated transfer pump 80 (FIG. 5) having an inlet connected via a conduit 82 to the bottom portion of the holding tank 20. The transfer pump 80 delivers the waste effluent to the processing tank 22 via a conduit 84 having an outlet located in the upper portion of the processing tank 22.

Means are provided for inducing a flow of air through the processing tank 22 above the maximum liquid level therein and out through the exhaust duct 18 to accelerate the evaporation of water. In the preferred construction illustrated, such means includes an air inlet 86 (FIGS. 2 and 3) in the holding tank 20, an air passage 88 (FIG. 3) in the processing tank 22 communicating with the holding tank 20, and an induction type, exhaust fan 90 (FIG. 4) in the exhaust duct 18. The holding tank air inlet 86 and the air passage 88 in the processing tank 22 are at a location above the maximum liquid level in the holding tank 20.

The effluent may include silver, other metals such as chromium, lead, and nickel, some organic materials and other particulate matter. To minimize the volume of waste to be refined for recovery of silver and other valuable metals or to be disposed, a portion of the slurry is periodically withdrawn from the processing tank 22 and introduced into one of the filter units 16. The solids and particulate matter in the slurry are separated and collect inside a filter bag 36.

In the preferred construction illustrated, an electrically operated filter pump 92 having an inlet connected via a conduit 94 to the processing tank 22 is provided for this purpose. The outlet of the filter pump 92 is connected to a common conduit 96 which is connected through a 3-way selector valve 98 to a first conduit 100 for directing the slurry into the inlet 35 of one filter unit 16 and a second conduit 102 for directing slurry into the inlet 35 of the other filter unit 16. To facilitate installation and removal of the filter bags 36, the conduits 100 and 102 preferably are flexible hoses and are connected to the inlets 35 by a quick disconnect type fixture. The filter selector valve 98 is selectively operable, either manually or automatically, between positions which direct slurry flow through either the first conduit 100 or the second conduit 102. While various suitable valves can be used, in the specific construction illustrated, the filter selector valve 98 is an electric motor-driven ball valve.

During operation, the waste effluent is first subjected to a predetermined heating cycle (e.g., 8 hours) with the exhaust fan 90 running to exhaust water vapors to atmosphere. The agitation pump 50 preferably is operated during this heating cycle to prevent the particulate matter suspended in the waste effluent from settling, to keep the heating element 26 clean and to enhance evaporation.

After completion of the heating cycle, the heater 24 is turned off and the slurry is allowed to cool to a temperature (e.g., 100°-110° F.) which begins to promote precipitation of dissolved solids. If not already operating, the agitation pump 50 is operated during this cooling cycle to keep the precipitating solids in suspension. The exhaust fan 90 preferably is operated during the cooling cycle to remove any water vapors from the processing tank 22.

After completion of this temperature reduction or cooling cycle, the filter pump 92 is periodically operated for a predetermined time (e.g., 4 seconds) to withdraw a predetermined quantity of the cooled slurry from the processing tank 22 and deliver it into one of the filter units 16. As the cooled slurry slowly passes through a filter bag 36, the precipitated solids collect inside the bag and the filtrate drains back into the processing tank 22. The filter bag 36 is allowed to substantially completely drain (e.g., for about 4 minutes) before the filter pump 92 is operated again. Periodic operation of the filter pump 92 is repeated in this manner to effect a fill and drain sequence throughout a filter cycle of a predetermined length of time (e.g., about 4 hours). Since the heater 24 is turned off during the filter cycle, the temperature of the slurry continues to drop and may even reach the ambient temperature in some cases. The exhaust fan 90 preferably is operated during the filter cycle.

It has been found that filtering slurry which has not been cooled causes the filter bags 36 to become caked with solids within a relatively short period. Also, it had been found that continuously circulating the slurry through a filter bag 36 creates a mixing action which tends to cause the precipitated solids to go back into solution and pass through the pores of the filter bag. Cooling the slurry before filtering and using a fill and drain sequence as described above minimizes both of these problems.

After the completion of the filter cycle, the heater 24 is turned back on and the heating, cooling and filter cycles are repeated.

Means preferably are provided for terminating the flow of cooled slurry into a filter unit 16 in response to the respective filter bag 36 becoming loaded with solids to the point where the pressure applied on the bag is high enough to cause the bag to stretch and possibly tear and/or cause the seal between the rinmg 42 and the retainer 44 to break. In the specific construction illustrated, such means includes a liquid level sensor 109 (FIG. 3) depending from the cover 32 and extending into the filter bag 36 to a predetermined liquid level corresponding to a maximum safe pressure or load on the filter bag 36. The level sensor 109 is operable to terminate operation of the filter pump 92 in response to the liquid in the filter bag 36 reaching the predetermined level during a fill and drain sequence.

When this occurs, the filter selector valve 98 can be operated to direct the flow from the filter pump 92 into the other filter unit 16. A full filter bag can be removed by disconnecting the conduit 100 or 102 from the respective filter inlet 35, unlatching the latches 34, lifting the cover 32 and the filter bag 36 out of the sleeve 28 and turning the knobs 46 to separate the retainer 44 from the cover 32 far enough to release the ring 42.

The solids collected in the filter bag 36, which usually represents about 5-10% of the original volume, have a relatively low moisture content, i.e., typically look and feel like wet sand. The solids from some waste effluents contain reclaimable materials such as silver.

Figure 8:
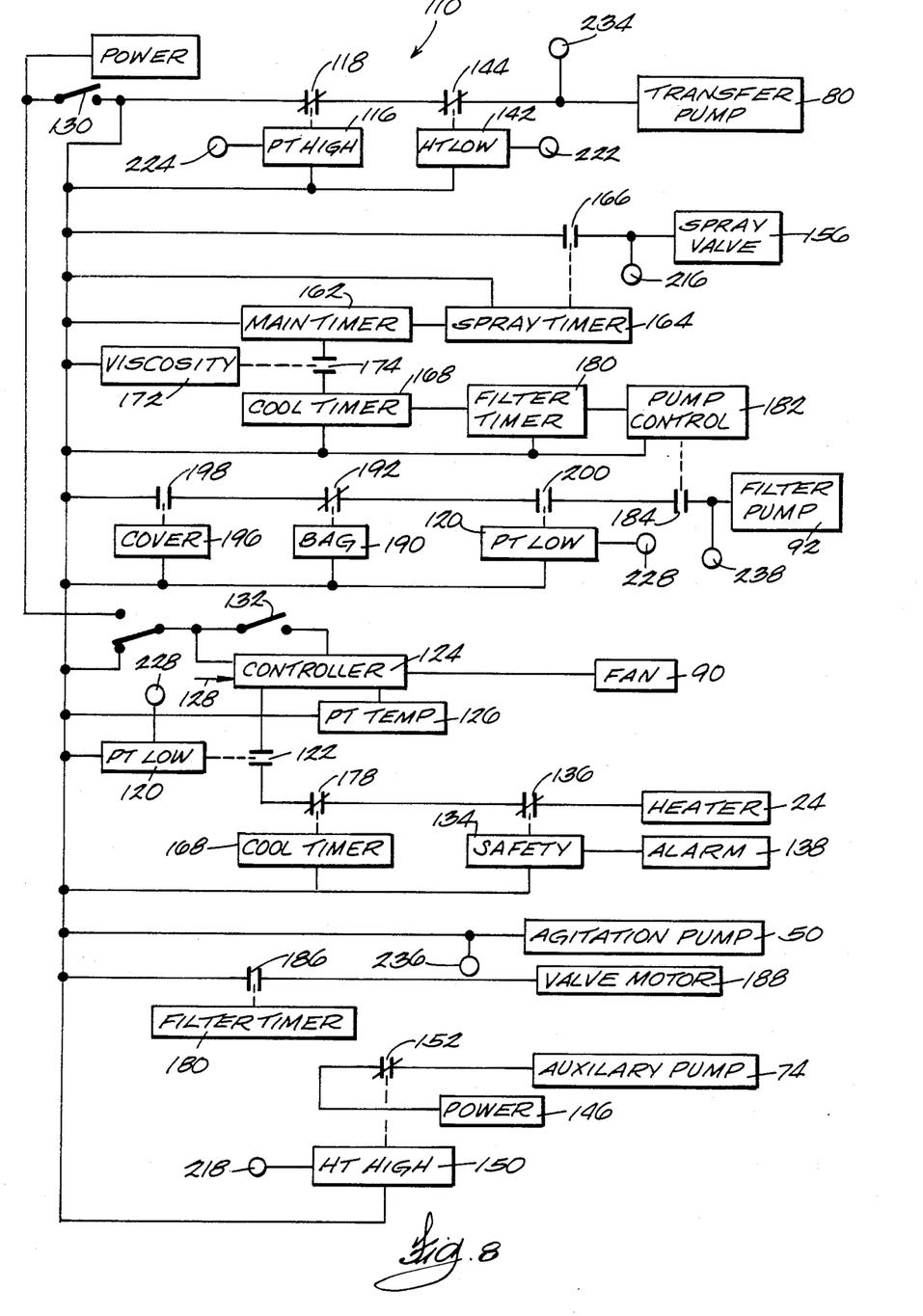
FIG. 8 is a schematic and block diagram of the electrical system for the device.

Operation of the transfer pump 80, the filter pump 92, the agitation pump 50, the fan 90, the heater 24, the filter selector valve 98, and the auxiliary pump 74, if used, can be controlled by an electrical system 110 illustrated diagrammatically in FIG. 8. It is arranged so that the device runs on demand and can be operated safely for extended periods of time without an operator.

The processing tank 22 includes a high liquid level sensor 112 (FIG. 3) at a location below the air passage 88 and corresponding to the desired maximum liquid level. The processing tank 22 also includes a low liquid level sensor 114 at a location corresponding to a desired minimum liquid level which insures that the volume of the liquid in the processing tank is sufficient to prevent the viscosity of the slurry from reaching a level where it cannot be readily recirculated by the agitation pump 50 and/or the filter pump 92. The processing tank (PT) high level sensor 112 is electrically connected to a relay 116 including normally closed contacts 118 in the power circuit for the transfer pump 80. The contacts 118 are closed to permit electrical power to be supplied to the transfer pump 80 when the liquid level in the processing tank 22 is below the PT high level sensor 112 and are opened to interrupt the supply of electrical power to the transfer pump 50 when this liquid level is above the PT high level sensor 112 and the relay 116 is energized.

The PT low level sensor 114 is electrically connected to a relay 120 including normally open contacts 122 in the power circuit for the heater 24. The contacts 122 are closed to permit electrical power to be supplied to the heater 24 when the liquid level in the processing tank 22 is above the PT low level sensor 114. The contacts 122 are opened to interrupt the supply of electrical power to the heater 24 any time the liquid level in the processing tank 22 drops below the PT low level sensor 114 and the relay 120 is energized.

The heater 24 and the fan 90 are electrically connected to a suitable controller 124 which is operable to adjust the electrical power supplied to the heater and the fan motor. The electrical system 110 includes an electrical temperature sensing device 126 which senses the temperature of the liquid in the processing tank 22 and transmits an electrical signal representative of that temperature to the controller 124. The controller 124 compares that temperature to a set point 128 and transmits the appropriate electrical power to the heater 24 to obtain the preset temperature. The controller 124 also compares the measured temperature to the set point and transmits the appropriate electrical power for increasing or decreasing the fan speed when the temperature is above and below the preset value, respectively.

The controller 124 and the fan motor are connected directly to the power input circuit of the electrical system and are operable even though the power switch 130 is not in the "on" position. A normally open pressure switch 132 in the exhaust duct 18 closes when the pressure delivered by the fan 90 reaches a predetermined pressure level (e.g., 0.3 p.s.i.) which insures that vapors are withdrawn from the processing tank 22.

Any time the device is connected to an electrical power source, the fan 90 turns on at a low setting. If the pressure switch 132 does not close within a predetermined time period, the fan motor increases the speed of the fan 90 incrementally at preset time intervals until the pressure switch 132 closes. If the pressure switch 132 is not closed within a predetermined time interval after the fan 90 reaches its maximum speed, an alarm is sounded.

Once the pressure switch 132 closes, the fan 90 remains at that speed until the temperature of the liquid contents of the heating tank 22 reaches a maximum preset temperature (e.g., 120°-160° F.). When that occurs, the heater 24 is turned off and the fan speed increases incrementally at predetermined time intervals until the temperature of the liquid contents drops below a preset minimum temperature. The heater 24 is then turned back on and the fan speed is decreased incrementally at predetermined time intervals until the temperature of the liquid contents reaches the preset maximum and the cycle is repeated. If the fan speed drops to a point where the pressure switch 132 opens, the fan speed is increased incrementally until the pressure switch 132 closes. Such an operation ensures that a sufficient flow of air is drawn from the processing tank 22 to maximize evaporation and maintain an efficient operation of the heater 24 and the fan 90.

The heater 24 includes an integral thermistor (not shown) which is electrically connected to a safety circuit including a relay 134 having normally closed contacts 136 in the power circuit for the heater 24. The contacts 136 are opened to interrupt the supply of electrical power to the heater 24 and an alarm 138 is sounded in the event the temperature of the heating element 26 reaches a predetermined temperature (e.g., 385° F.) above which parts could melt or otherwise be damaged.

In the specific embodiment illustrated, the agitation pump 50 is connected in the electrical system so that it operates any time the power switch 130 is in the "on" position.

The holding tank 20 includes a low liquid level sensor 140 (FIG. 3) at a location corresponding to the desired minimum liquid level therein. The holding tank (HT) low level sensor 140 is electrically connected to a relay 142 including normally closed contacts 144 in the power circuit for the transfer pump 80. The contacts 144 are closed to permit electrical power to be supplied to transfer pump 80 when the liquid level in the holding tank is above the HT low level sensor 140 and are opened to interrupt the supply of electrical power to the transfer pump 80 when this liquid level is below the HT low level sensor 140.

Thus, when the power switch 130 is in the "on" position, the transfer pump 80 automatically commencing transferring effluent from the holding tank 20 to the processing tank 22 any time the liquid level in the holding tank 20 is above the HT low level sensor 140 and the liquid level in the processing tank 22 drops below the PT low level sensor 114 and continues tansferring until the liquid level in the processing tank 22 reaches the PT high level sensor 112.

The auxiliary pump 74 is connected to a power source 146 independent of the device and is electrically connected to the electrical system 110 for operational control. The holding tank 20 includes a high liquid level sensor 148 at a location corresponding to the desired maximum liquid level. The holding tank (HT) high level sensor 148 is electrically connected to a relay 150 including normally closed contacts 152 in the power circuit for the auxiliary pump 74. The contacts 152 are closed to permit electrical power to be supplied to the auxiliary pump 74 when the liquid level in the holding tank 20 is below the HT high level sensor 148 and are opened to interrupt the supply of electrical power to the auxiliary pump 74 when this liquid level is above the HT high level sensor 148 and the relay 150 is energized.

Thus, when the auxiliary pump 74 is connected to the power source 146 and electrically connected to the electrical system 110, it automatically delivers effluent from a photographic processor to the holding tank 20 any time the liquid level in the holding tank 20 is below the HT high level sensor 148. The electrical system 110 can be arranged so that, in the event the liquid level in the holding tank 20 is at or above the HT high level sensor 148, the auxiliary pump 74 is inoperative and an alarm is sounded to warn the operator to direct the effluent stream to a different storage container or turn off the processor.

Figure 5:
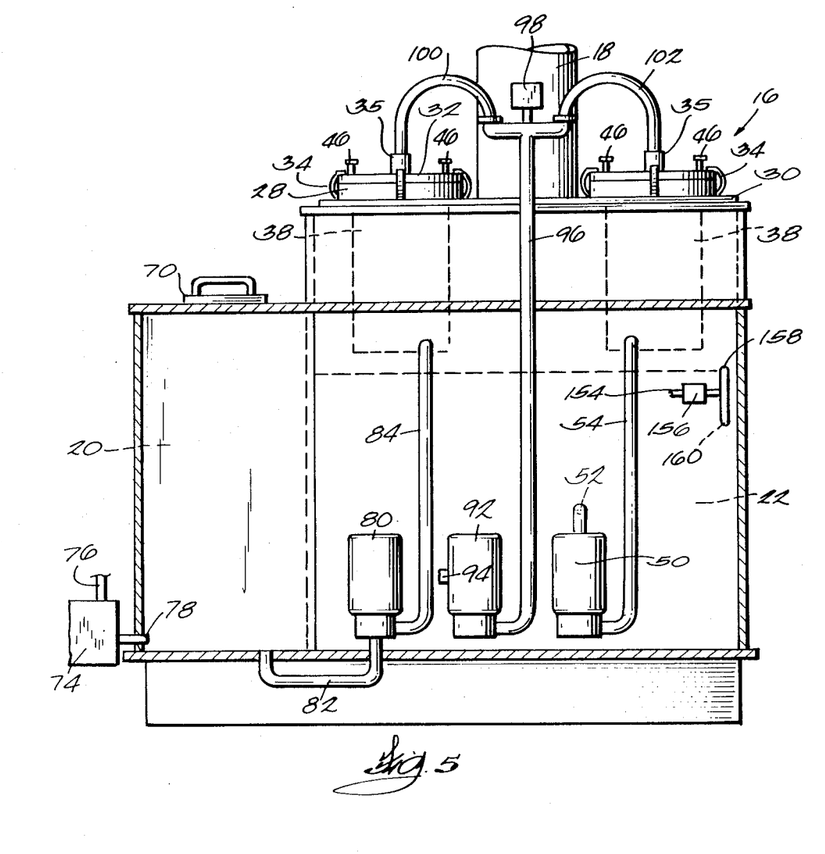
FIG. 5 is front sectional view taken generally along line 5—5 in FIG. 2.

The PT high and low level sensors 112 and 114 preferably are periodically sprayed with liquid to prevent the accumulation of solids thereon. Referring to FIGS. 4 and 5, a supply of municipal water is connected via a conduit 154 to the inlet of a solenoid-operated valve 156 mounted on the front wall of the processing tank 22. The valve 156 controls the flow of water through a pair of short pipes 158 and 160 which direct a spray over the sensinmg portions of the PT high and low level sensors 112 and 114, respectively, as illustrated in FIG. 4. Alternately, the spray valve 156 can be replaced with an electrically operated pump (not shown) which is connected to the holding tank and is operable to periodically pump a flow of waste effluent from the holding tank over the sensing portions of the HT high and low level sensors 112 and 114.

In the specific embodiment illustrated, the electrical system 110 is arranged to automatically sequence the heating, cooling, filter and spray cycles. A 24-hour timing device 162 triggers these cycles during normal operation. The main timing device 162 is electrically connected to a spray timer 164 operably connected to normally open contacts 166 in the power circuit for the solenoid of the spray valve 156. The contacts 166 are closed and electrical power is supplied to the solenoid when the spray timer 164 is energized by the main timing device 162. The spray timer 164 returns the contacts 166 to their normally open position after a predetermined spray time (e.g., 10 seconds). The main timing 162 also triggers a timer 168 which controls the cooling cycle.

The specific gravity or viscosity of the slurry in the processing tank 22 is measured by suitable measuring device 170 (illustrated schematically in FIG. 3), such as vicosimeter or the like, operably connected to a relay 172 including normally open contacts 174 in the circuit between the main timing device 162 and the cooling cycle timer 168. The contacts 174 are closed in response to the measuring device 170 sensing a predetermined specific gravity or viscosity corresponding to the maximum desired for the slurry.

The heating cycle and the agitation pump 50 is started when the power switch 130 is moved to the "on" position. As pointed out above the fan 90 is turned on when the device is connected to an electrical power source. The illustrated electrical system 110 is arranged so that both the fan 90 and agitation pump 50 continue to operate throughout the heating, cooling and filter cycles.

At one or more preset times during each 24-hour period, the main timing device 162 sends a signal to energize the spray timer 164 which opens the spray valve 156 for a predetermined time. At the same time, the main timing device 162 sends a signal to energize the cooling cycle timer 168 if the contacts 174 are closed because the specific gravity or the viscosity of the slurry is above the predetermined maximum value. If the contacts 174 are not closed, the heating cycle continues until the main timing device 162 sends another signal at the next preset time.

The cooling cycle timer 168 is operably connected to normally closed contacts 178 in the power circuit for the heater 24. The contacts 178 are opened to interrupt the supply of electrical power to the heater 24 in response to operation of the cooling cycle timer 168 and remain open for a predetermined time period (e.g., 7 hours) governed by the cooling cycle timer 168. At the end of that time period, the contacts 178 return to their normally closed position and the heater 24 is turned back on, unless the the relay 120 or the relay 134 is energized.

Upon energization by the main timing device 162, the cooling cycle timer 168 also sends a signal to energize a timer 180 which controls the filter cycle. The filter cycle timer 180 triggers a timer 182 which controls the operation of the filter pump 92. The filter cycle timer 180 is set to delay sending a signal to the filter pump control timer 182 for a predetermined time period (e.g., 1½ to 2 hours) required for the slurry to cool down to a temperature which promotes precipitation of solids in the slurry and then subsequently de-energizes the filter pump control timer 182 after a predetermined time period (e.g., 4–5 hours).

The filter pump control timer 182 is operably connected to normally open contacts 184 in the power circuit for the filter pump 92. The contacts 184 are closed to permit electrical power to be supplied to the filter pump 92 in response to operation of the filter pump control timer 182 which is set to operate the filter pump 92 for a relatively short period (e.g., 4 seconds) to introduce a quantity of the cooled slurry into a filter unit 16. The filter pump control timer 182 then opens the contacts 184 to turn the filter pump 92 off for a longer period (e.g., 4 minutes), so the cooled slurry can completely drain through the filter bag, and then repeats this fill and drain sequence throughout the filter cycle.

The filter cycle timer 180 is operably connected to normally open contacts 186 in the power circuit for a reversible electric motor 188 which drives the filter selector valve 98 between the two filter positions. Thus, the selector valve 98 is moved from one filter position to the other each time the filter cycle timer 180 is energized.

The level sensors 109 in the filter units 116 are electrically connected to a relay 190 including normally closed contacts 192 in the power circuit for the filter pump 92. The contacts 192 are opened to interrupt the supply of electrical power to the filter pump 92 in the event the liquid level in the filter bag 36 of the filter unit 16 into which the cooled slurry is being introduced reaches the respective level sensor 109.

Each of the filter units 16 includes an electrical switch 194 (one shown schematically for right filter unit in FIG. 3) which is operable to indicate whether the respective cover 132 is open or closed. The switches 194 are electrically connected to a relay 196 including normally open contacts 198 in the power circuit for the filter pump 92. The contacts 198 are closed to permit electrical power to be supplied to the filter pump 92 when the cover 132 of the filter unit 116 into which cooled slurry is being introduced is closed to energize the relay 196. The contacts 198 are opened to interrupt the supply of electrical power to the filter pump 92 in the event the filter unit cover is not closed.

The PT low level sensor relay 120 includes normally open contacts 200 in the power circuit to the filter pump 92. The contacts 200 are closed to permit electrical power to be supplied to the filter pump 92 when the liquid level in the processing tank 22 is above the PT low level sensor 114 to energize the relay 120 and are opened to interrupt the supply of electrical power to the filter pump 92 when this liquid level is below the PT low level sensor 114.

Thus, the filter pump 92 cannot operate if the filter unit 32 is not closed, the filter bag 36 is full or the liquid level in the processing tank 22 is below the PT low level sensor 114.

Figure 9:
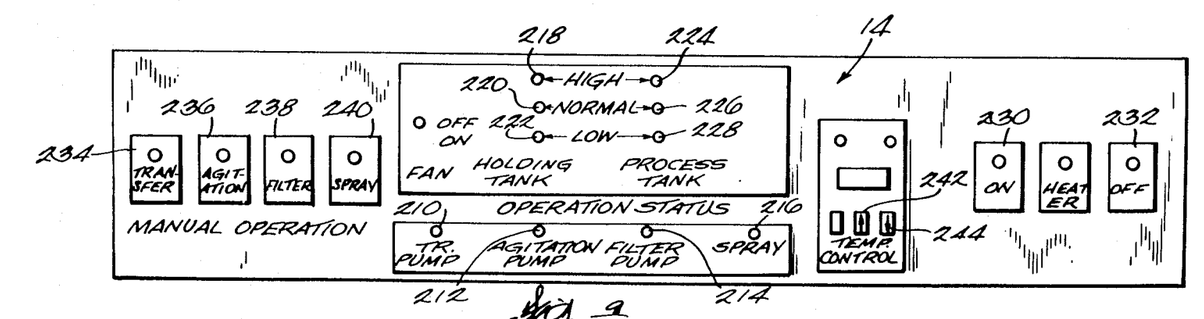
FIG. 9 is an enlarged elevational view of the control panel.

The front control panel 14 includes lights 210, 212 and 214 which respectively indicate when the transfer pump, the agitation pump and the filter pump is operating and a light 216 which indicates when the spray valve is open. It also includes lights 218, 220 and 222 which indicate the liquid level in the holding tank 20 and lights 224, 226, and 228 which indicate the liquid level in the processing tank 22.

The control panel 14 also includes touch type switches 230 and 232 for turning the electrical power on and off, touch type switches 234, 236, 238 and 240 for manually operating the pumps and the spray valve and touch type switches 242 and 244 for adjusting the temperature setting of the heater.

Figure 10:
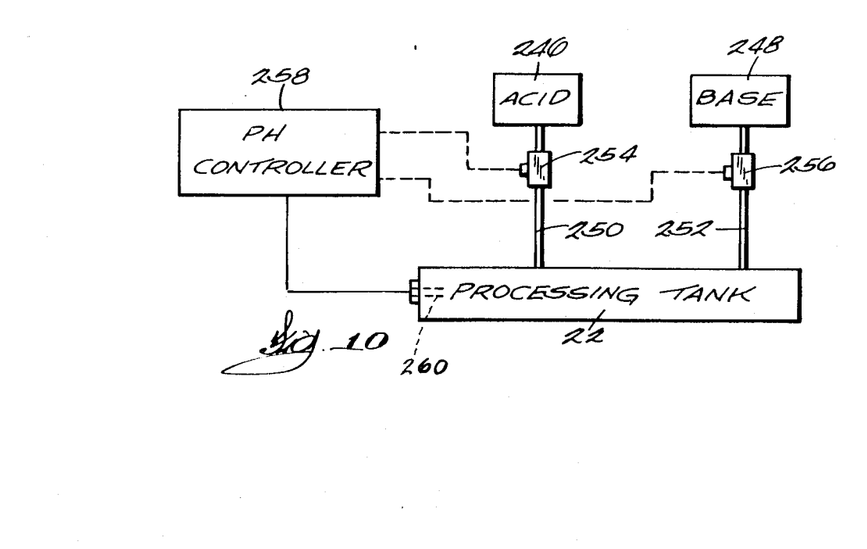
FIG. 10 is a schematic illustration of an alternate embodiment including a pH control.

The tendency for some waste effluents to produce toxic vapors is directly related to the pH during heating. FIG. 10 illustrates an alternate embodiment including a system for maintaining the pH of the liquid in the processing tank 22 within a predetermined range. In this embodiment, a container 246 of an acidic solution and a container 248 of an alkaline or base solution are connected to the processing tank 22 via respective conduits 250 and 252 and respective solenoid-operated valves 254 and 256. Operation of the valves 254 and 256 is controlled by a suitable controller 258 electrically connected in the electrical system 110. The controller 258 receives a signal representative of the pH of the liquid in the processing tank 22 from a pH sensing device 260, compares that signal to a set point for the desired pH and transmits a signal to operate either valve 254 or valve 256, depending whether the measured pH is above or below the set point. The controller 258 can be set to keep a valve opened for a predetermined time interval and not reopen that valve for some time, even though the measured pH still varies from set point, in order to give the added solution time to become dispersed.

From the foregoing description, one skilled in the art can easily ascertain the essential features of the invention and, without departing from the spirit and scope thereof, make various changes and modifications to adapt it to various usages.

We claim:

1. A device for reducing by evaporation the volume of an aqueous waste effluent containing dissolved solids and dispersed particulate matter comprising
    a holding tank for receiving the waste effluent;
    a heating tank for receiving waste effluent from said holding tank and including a heater for heating the waste effluent contained therein to a predetermined temperature which is below the boiling point of water and high enough to cause a portion of the water to evaporate and be discharged as water vapor, leaving a slurry containing solids and particulate matter;
    means for transferring waste effluent from said holding tank into said heating tank;
    an exhaust duct connected in communication with the upper portion of said heating tank through which water vapors are discharged;
    one or more filter units for separating and collecting solids from said slurry passing therethrough, and having an outlet for returning the filtrate from said filter unit to said heating tank and an inlet;
    means for terminating operation of said heater for a sufficient time to allow the slurry in said heating tank to cool to a temperature which promotes precipitation of dissolved solids therein;
    means for withdrawing a predetermined quantity of the cooled slurry from said heating tank and delivering same into said filter unit; and
    means for agitating the liquid contents of said heating tank.

2. A device that according to claim 1 wherein said agitation means includes
    an agitation pump for recirculating the liquid contents of said heating tank and having an inlet connected in communication with said heating tank and an outlet; and
    means connected in communication with the outlet of said agitation pump for dispersing the recirculating liquid into the bottom portion of said heating tank in a manner which produces a churning action at the surface of the liquid contents of said heating tank.

3. A device according to claim 2 wherein
    said heater includes a heating element immersed in the liquid contents in said heating tank; and
    said dispersing means includes means for directing an upward flow of the recirculated liquid past said heating element.

4. A device according to claim 1 including
    an ambient air inlet in said holding tank above the maximum liquid level therein;
    means in said heating tank above the maximum liquid level therein connecting said air inlet in communication with said exhaust duct; and
    an exhaust fan in said exhaust duct.

5. A device according to claim 1 wherein said filter unit includes a vertically extending filter bag having an open upper end removably supported from said heating tank and a lower end located inside said heating tank above the maximum liquid level therein.

6. A device according to claim 5 including a perforated sleeve surrounding said filter ag for limiting the expansion of said filter bag during filtering.

7. A device according to claim 5 wherein
    each of said filter units includes a filter inlet through which the cooled slurry is introduced into said filter bag; and said withdrawing means includes a filter pump having an inlet connected in communication with said heating tank and an outlet, filter conduit means connecting said filter pump outlet in communication with each of said filter inlets and valve means in said filter conduit means for selectively directing the flow of the cooled slurry from said filter pump into one of said filter units.

8. A device according to claim 7 including means for terminating operation of said filter pump in response to a said filter bag becoming filled with a predetermined amount of solids.

9. A device according to claim 7 wherein said heater and said filter pump are electrically operated and said device includes a control for operating said heater and said filter pump, said control comprising
an electrical system interconnecting said heater and said filter pump;
means in said electrical system for interrupting electrical power to said heater for a predetermined cooling period; and
means in said electrical system for initiating operation of said filter pump a predetermined time after the cooling period has commenced and thereafter operating said filter pump for a predetermined filter period.

10. A device according to claim 9 wherein said electrical system includes means for operating said filter pump periodically during the filter cycle to deliver a predetermined amount of the cooled slurry into a said filter unit.

11. A device according to claim 9 wherein
said control includes a liquid low level sensing means in said heating tank at a level corresponding to the desired minimum liquid level therein; and
said electrical system includes means for permitting and interrupting the supply of electrical power to said heater and said filter pump in response to the liquid level in said heating tank being above and dropping below said heating tank low level sensing means, respectively.

12. A device according to claim 11 wherein
said waste effluent transfer means includes an electrically operated transfer pump electrically connected in said electrical system;
said control means includes a liquid high level sensing means in said heating tank at a location corresponding to the desired maximum liquid level therein and a liquid low level sensing means in said holding tank at a location corresponding to the desired minimum liquid level therein; and
said electrical system includes means for permitting and interrupting the supply of electrical power to said transfer pump in response to the liquid level in said heating tank being below and rising above said heating tank high level sensing means, respectively, and means for permitting and interrupting the supply of electrical power to said transfer pump in response to the liquid level in said holding tank being above and dropping below said holding tank low level sensing means, respectively.

13. A device according to claim 12 including means for periodically directing a flow of water or the waste effluent over said heating tank high and low level sensing means.

14. A device according to claim 12 including an electrically operated auxillary pump electrically connected in said electrical system for delivering waste effluent into said holding tank and wherein
said control means includes a liquid high level sensing means in said holding tank at a level corresponding to the desired maximum liquid level therein; and
said electrical system includes means for permitting and interrupting the supply of electrical power to said auxillary pump in response to the liquid level in said holding tank being below and rising above said holding tank high level sensing means, respectively.

15. A device according to claim 1 including
a supply of an acid solution including first valve means which is selectively operable to introduce the acid solution into said heating tank;
a supply of an alkaline solution including second valve means which is selectively operable to introduce the alkaline solution into said heating tank;
pH sensing means in said heating tank for sensing the pH of the liquid contents of said heating tank; and
a controller means interconnecting said pH sensing means with said first and second valve means and operable to open said first valve means for a predetermined time period in response to pH of the liquid contents of said heating tank being above a predetermined level and to open said second valve means for a predetermined time period in response to the pH of the liquid contents of said heating tank being below a predetermined level.

16. A device according to claim 9 including
a fan in said exhaust duct;
temperature sensing means in said heating tank for sensing the temperature of the liquid contents therein;
variable speed electric motor for operating said fan; and
controller means in said electrical system connected to said fan motor and operable to increase and decrease the speed of said fan in response to the temperature of the liquid contents of said heating tank dropping below and increasing above a predetermined level, respectively.

17. A device according to claim 9 wherein
said control means includes a liquid level sensing means in each of said filter units located in the respective filter bag at a location corresponding to a predetermined maximum load on said filter bag; and
said electrical system includes means for permitting and interrupting the supply of electrical power to said filter pump in response to the liquid level in a said filter bag being below and rising above said filter bag level sensing means, respectively.

18. A device according to claim 9 wherein
each of said filter units has a cover supporting said filter bag and including said filter inlet;
said control means includes switch means on each of said filter units for indicating when said cover is in an open or closed position; and
said electrical system includes means for permitting and interrupting the supply of electrical power to said filter pump when said switch indicates said cover is in the closed and open positions, respectively.

19. A method for reducing by evaporation the volume of an aqueous waste effluent containing dissolved solids comprising the steps of:

(a) introducing the waste effluent into a heating chamber;

(b) heating the waste effluent for a predetermined heating cycle in the heating chamber to a temperature which is below the boiling point of water and high enough inside the heating chamber to cause a portion of the water to evaporate and be discharged as water vapor, leaving a slurry containing solids;

(c) after completion of the heating cycle, initiating a cooling cycle during which the slurry in the heating chamber is allowed to cool to a temperature which promotes precipitation of dissolved solids;

(d) after completion of the cooling cycle and for a predetermined filter cycle, withdrawing a portion of the cooled slurry from the heating chamber, passing same through a filter unit separate and collect solids therefrom, and returning the filtrate from the filter unit to the heating chamber;

(e) after completion of the filter cycle, repeating (a) through (d);

(f) passing a flow of ambient air over the liquid into the heating chamber and withdrawing same along with water vapors from the top portion of the heating chamber at least during the heating cycle; and (g) agitating the contents of the heating chamber to minimize settling of solids therefrom at least during the cooling and filter cycles.

20. A method according to claim 19 wherein step (f) is carried out continuously throughout the heating, cooling and filter cycles.

21. A method according to claim 19 wherein step (g) is carried out continuously throughout the heating, cooling and filter cycles.

22. A method according to claim 19 wherein
the filter unit includes a vertical filter bag having an open top; and
during step (d) a predetermined quantity of the cooled slurry is periodically introduced into the top of the filter bag and the filtrate drains from the filter bag back into the heating chamber.

23. A method according to claim 19 including the steps of:
measuring the specific gravity of the slurry in the heating chamber; and
initiating the cooling cycle after the specific gravity reaches a predetermined value.

24. A method according to claim 22 including the steps of:
sensing the liquid level in the filter bag; and
terminating the filter cycle in response to the liquid in the filter bag reaching a predetermined level.

* * * * *